United States Patent [19]

Rankel et al.

[11] 4,388,285

[45] Jun. 14, 1983

[54] PROCESS FOR THE PREPARATION OF ZSM-5 UTILIZING TRANSITION METAL COMPLEXES DURING CRYSTALLIZATION

[75] Inventors: Lillian A. Rankel, Princeton, N.J.; Ernest W. Valyocsik, Yardley, Pa.

[73] Assignee: Mobil Oil Corporation, New York, N.Y.

[21] Appl. No.: 320,285

[22] Filed: Nov. 12, 1981

[51] Int. Cl.³ .............................................. C01B 33/28
[52] U.S. Cl. ................................ 423/329; 252/455 Z; 423/326; 423/328
[58] Field of Search ............................... 423/326–330; 252/455 Z

[56] References Cited

U.S. PATENT DOCUMENTS

| | | | |
|---|---|---|---|
| 3,373,109 | 3/1968 | Frilette et al. | 252/455 Z |
| 3,702,886 | 11/1972 | Arqauer et al. | 423/328 |
| 3,941,871 | 3/1976 | Dwyer et al. | 423/326 |
| 4,100,262 | 7/1978 | Pelrine | 423/329 |
| 4,208,305 | 6/1980 | Kouwenhoven et al. | 423/328 X |

*Primary Examiner*—Edward J. Meros
*Attorney, Agent, or Firm*—Charles A. Huggett; Michael G. Gilman; Charles J. Speciale

[57] ABSTRACT

A series of transition metal complexes, having stability at relatively high pH, have been utilized as templates for the synthesis of ZSM-5 type zeolites.

4 Claims, No Drawings

PROCESS FOR THE PREPARATION OF ZSM-5 UTILIZING TRANSITION METAL COMPLEXES DURING CRYSTALLIZATION

BACKGROUND OF THE INVENTION

The present invention relates to a method for the preparation of zeolites having the x-ray diffraction pattern characteristic of ZSM-5 and, more particularly, to a novel process for the preparation of ZSM-5 type zeolites utilizing certain transition metal complexes as templates for the synthesis of said zeolite materials.

DESCRIPTION OF THE PRIOR ART

ZSM-5 has been the subject of much patent and technical literature in recent years and is disclosed and claimed in U.S. Pat. No. 3,702,886; the disclosure of which is herein incorporated by reference. It has often been desirable in the prior art to include a metal complex, including transition metal complexes in the conventional forming solution for the preparation of ZSM-5. In this connection, typical prior art patents, such as U.S. Pat. Nos. 4,100,262; 3,941,871; 3,709,979; 3,702,886; 3,373,109 generally teach the incorporation of metals into zeolites including ZSM-5. However, in all the above-mentioned procedures, the metal was not used as a template but was merely, at most, added to the conventional crystallization mix which contained a quaternary ammonium cation or a precursor thereof. In other words, in the prior art techniques for the formation of zeolites wherein metals were introduced into the forming solution, the forming solution itself would have produced the same zeolite irrespective of the presence or absence of the metal. Thus, it is clear that the metal was not acting as a template for the formation of the zeolite, but the organic cation was in fact the template.

In summary, the instant invention differs from all the above because transition metal compounds are used as templates and has eliminated the quaternary ammonium cation or precursor thereof which has previously been required in the synthesis of ZSM-5. Thus, in the instant invention the transition metal compounds are necessary for crystallization at the high silica-to-alumina conditions used for synthesis and without the transition metal templates present, no crystalline material would be obtained.

DESCRIPTION OF THE PREFERRED EMBODIMENTS

The novel process of this invention is carried out by mixing a suitable source of silica, a source of alumina, a source of alkali metal, and at least one transition metal complex which will be hereinafter identified and heating the same at elevated temperatures ranging from about 100° to about 250° C. and preferably from about 150° to about 160° C. until crystallization is complete. Crystallization time can vary from about one day to about seven days and it is preferred that the crystallization be carried out while stirring.

The metal complexes which are operable in the novel process of this invention include (1) metal phthalocyanines of the formula:

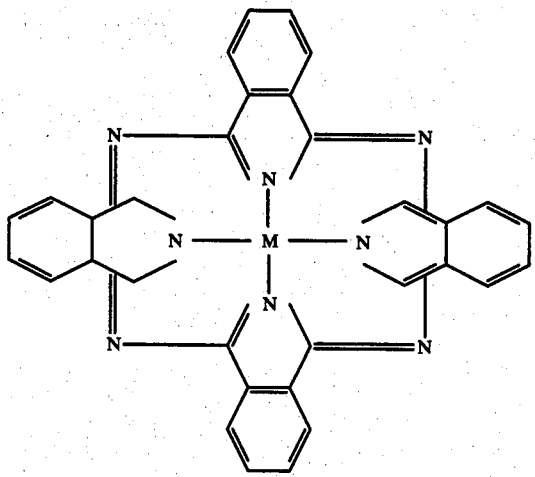

wherein M can be copper, cobalt, lithium, vanadium oxide (VO) or hydrogen.

(2) Iron cyclopentadienyl type complexes:

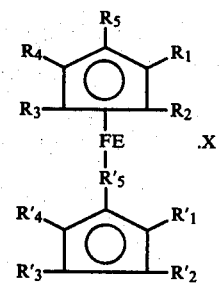

wherein R and R' can be hydrogen, a lower alkyl having 1–5 carbon atoms, and one R or R' can be $(CH_2)_yN(CH_3)_3$ wherein Y is 0 or 1 and X is bromide, chloride, or iodide, or other such suitable anion.

(3) Complexes containing a —N—C—C—N— aromatic grouping such as (a) bipyridine:

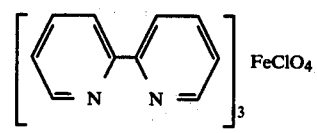

(b) 1-10, phenanthroline (0-phenan)

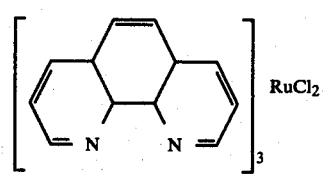

As has heretofore been stated, zeolite ZSM-5 can be conveniently prepared by forming a mixture of alumina, silica, alkali metal oxide, water, and the above-described metal complexes such that the mixture has a composition in terms of mole ratios of oxides falling within the following range:

|  | Broad | Preferred |
|---|---|---|
| $Al_2O_3/SiO_2$ | 0–0.2 | 0.001–0.05 |
| $H_2O/SiO_2$ | 5–200 | 10–100 |
| $OH^-/SiO_2$ | 0–3.0 | 0.1–1.0 |
| alkali metal/$SiO_2$ | 0.01–3.0 | 0.1–2.0 |
| $M/SiO_2$ | 0.002–2.0 | 0.1–1.0 | wherein M is moles of complexed metal. The alkali metal can be any member of Group I elements, but is preferably sodium.

Zeolite ZSM-5 possesses a definite distinguishing crystalline structure whose x-ray diffraction pattern shows the following significant lines:

TABLE I

| Interplanar Spacing d(A) | Relative Intensity |
|---|---|
| 11.1 ± 0.3 | S |
| 10.0 ± 0.3 | S |
| 7.4 ± 0.2 | W |
| 7.1 ± 0.2 | W |
| 6.3 ± 0.2 | W |
| 6.04 ± 0.2 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.04 ± 0.03 | W |
| 2.99 ± 0.02 | W |
| 2.94 ± 0.02 | W |

These values were determined by standard technique. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, $100I/I_o$, where $I_o$ is the intensity of the strongest line or peak, and d (obs), the interplanar spacing in A, corresponding to the recorded lines, were calculated. In Table I the relative intensities are given in terms of the symbols W=Weak, S=Strong and VS=Very Strong. It should be understood that this x-ray diffraction pattern is characteristic of all the species of ZSM-5 zeolites. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

The reaction mixture is maintained at a temperature of from about 100° F. to about 500° F. for a period of time of from about 1 hour to about 180 days until crystals of ZSM-5 are formed. A more preferred temperature range is from about 180° F. to about 350° F. for a period of time at a temperature within such preferred range being from about 2 hours to about 30 days.

The digestion of the gel particles is carried out until crystals form. The solid product is separated from the reaction medium, as by cooling the whole to room temperature, filtering and water washing.

The composition for the synthesis of ZSM-5 can be prepared utilizing materials which can supply the appropriate oxide. Such materials include aluminates, alumina, silicates, silica hydrosol, silica gel, silicic acid and hydroxides. It will be understood that each oxide component utilized in the reaction mixture for preparing ZSM-5 can be supplied by one or more essential reactants and they can be mixed together in any order. For example, any oxide can be supplied by an aqueous solution, sodium hydroxide or by an aqueous solution of a suitable silicate. The reaction mixture can be prepared either batchwise or continuously.

The ZSM-5 composition as prepared hereby has the characteristic x-ray diffraction pattern of conventionally prepared ZSM-5, the values of which are set forth in Table I.

Even though the presently prepared ZSM-5 can often have a low amount of alkali metal, e.g. sodium, ions, as synthesized, and therefore can be utilized as catalytic material for a number of hydrocarbon conversion reactions substantially as synthesized, the original cations of the as-synthesized ZSM-5 can be replaced in accordance with techniques well known in the art, at least in part, by ion exchange with other cations. Preferred replacing cations include metal ions, ammonium ions, hydrogen ions and mixtures thereof. Particularly preferred cations are those which render the zeolite catalytically active especially for hydrocarbon conversion. These include hydrogen, rare earth metals, aluminum, metals of Groups IIA, IIIB, IVB, VIB, VIII, IB IIB, IIIA, IVA. Of the replacing metallic cations, particular preference is given to cations of metals such as rare earth, Mn, Ca, Mg, Zn, Cd, Pd, Ni, Co, Ti, Al, Sn, Fe and Co.

A typical ion exchange technique would be to contact the synthetic ZSM-5 zeolite after calcination with a solution of a salt of the desired replacing cation or cations. Although a wide variety of salts can be employed, particular preference is given to chlorides, nitrates and sulfates.

Representative ion exchange techniques are disclosed in a wide variety of patents, including U.S. Pat. Nos. 3,140,249; 3,140,251 and 3,140,253.

Following contact with the salt solution of the desired replacing cation, the zeolite is then preferably washed with water and dried at a temperature ranging from 150° F. to about 600° F. and thereafter may be calcined in air or other inert gas at temperatures ranging from about 500° F. to 1500° F. for periods of time ranging from 1 to 48 hours or more to produce a catalytically-active thermal decomposition product thereof.

Regardless of the cation replacing the cations in the as-synthesized form of ZSM-5, the spatial arrangement of the aluminum, silicon and oxygen atoms which form the basic crystal lattices of ZSM-5 remains essentially unchanged by the described replacement of the original cations as determined by taking an x-ray powder diffraction pattern of the ion exchanged material.

The hereby prepared zeolite ZSM-5 may be used in the conversion of a wide variety of organic compounds, e.g. hydrocarbon compounds and oxygenates such as methanol. Such processes include, for example, alkylation of aromatics with olefins, aromatization of normally gaseous olefins and paraffins, aromatization of normally liquid low molecular weight paraffins and olefins, isomerization of aromatics, paraffins and olefins, disproportionation of aromatics, transalkylation of aromatics, oligomerization of olefins and cracking and hydrocracking. All of the foregoing catalytic processes are of value since they result in upgrading of the organic charge being processed.

In the past few years the potential use of large crystal ZSM-5 in numerous catalytic processes has been demonstrated. These processes include alkylation of toluene with methanol, selective toluene disproportionation, methanol to gasoline and p-ethyltoluene production. Selectivity gains in these processes result from the conversion of an undesirable, diffusionally limited intracrystalline product to a smaller, more desirable product which leaves the crystal more readily with less chance of further reaction. Further reaction is limited by the more diffusionally restrictive large crystal ZSM-5.

Synthetic ZSM-5 zeolites prepared in accordance hereto can be used either in the alkali metal form or hydrogen form or another univalent or multivalent cationic form. They can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to ZSM-5 such as, for example, by, in the case of platinum, treating the zeolite with a platinum metal-containing ion. Thus, suitable platinum compounds for this purpose include chloroplatinic acid, platinous chloride and various compounds containing the platinum amine complex. Combinations of metals and methods for their introduction can also be used.

In the case of many catalysts, it is desired to incorporate the ZSM-5 hereby prepared with another material resistant to the temperatures and other conditions employed in organic conversion processes. Such matrix materials include active and inactive materials and synthetic or naturally occurring zeolites as well as inorganic materials such as clays, silica and/or metal oxides. The latter may be either naturally occurring or in the form of gelatinous precipitates, sols or gels including mixtures of silica and metal oxides. Use of a material in conjunction with the ZSM-5, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Frequently, zeolite materials have been incorporated into naturally occurring clays, e.g. bentonite and kaoline. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into power-like materials which cause problems in processing.

Naturally occurring clays which can be composited with the hereby synthesized ZSM-5 catalyst include the montmorillonite and kaoline family, which families include the sub-bentonites, and the kaolines commonly known as Dixie, McNamee, Georgia and Florida clays or others in which the main mineral constituent is halloysite, kaolinite, dickite, nacrite, or anuaxite. Such clays can be used in the raw state or initially subjected to calcination, acid treatment or chemical modification.

In addition to the foregoing materials, the ZSM-5 catalyst hereby synthesized can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline aluminosilicate ZSM-5 and inorganic oxide gel matrix vary widely with the crystalline aluminosilicate content ranging from about 1 to about 90 percent by weight and more usually in the range of abut 10 to about 70 percent by weight of the composite.

One particular advantage of the novel process of this invention is that the metal complexes actually incorporate the metal inside the zeolite structure and, in order to test this hypothesis, certain of the preparations were subjected to contact with ethylenediamine tetraacetic acid in ammonium nitrate exchange in order to determine whether or not the metal in the metal complex could be removed from the aluminosilicate structure. As will be seen from certain of the examples which follow, these techniques were not effective in removing the metal from the structure.

The following examples will illustrate the novel process of this invention.

EXAMPLES 1–23

In all the examples which follow crystallizations were carried out with Q-brand sodium silicate (27.8% $SiO_2$; 8.4% $Na_2O$; 63.8% $H_2O$) and $Al_2(SO_4)_3.16\ H_2O$ at 160° C. while stirring at autogenous pressure. In all the Examples which follow the $H_2O/SiO_2$ molar ratio was 40 and the $Na^+/SiO_2$ molar ratio was 0.6. Additional reaction compositions and the results obtained are shown in the following table:

TABLE II

| | Crystallizations with Metal Complexes | | | | | |
|---|---|---|---|---|---|---|
| | Mixture Mole Ratios[a] | | | | | |
| Ex. | $\frac{SiO_2}{Al_2O_3}$ | $\frac{OH^-}{SiO_2}$ | $\frac{M}{SiO_2}$ | Compound | Days | Product |
| 1 | 90 | 0.40 | 0.10 | $(C_8H_4N_2)_4$ | 3 | 35% ZSM-5 + unident. component |
| 2 | 180 | 0.40 | 0.05 | $(C_8H_4N_2)_4Co$ | 3 | 10% ZSM-5 + unident. component |
| 3 | 120 | 0.40 | 0.10 | ↓ | 3 | 25% ZSM-5 |
| 4 | 90 | 0.60 | 0.05 | ↓ | 4 | 15% mordenite + unident. component. |
| 5 | 90 | 0.40 | 0.10 | ↓ | 4 | 50% ZSM-5 + unident. component |
| 6 | 90 | 0.30 | 0.10 | ↓ | 3 | 20% ZSM-5 + α-cristobalite |
| 7 | 90 | 0.10 | 0.02 | ↓ | 3 | 5% ZSM-5 |
| 8 | 90 | 0.40 | 0.10 | $(C_8H_4N_2)_4Ni$ | 2 | Amorphous |
| 9 | 180 | 0.40 | 0.10 | $(C_8H_4N_2)_4VO$ | 3 | 15% ZSM-5 |

TABLE II-continued

Crystallizations with Metal Complexes

| Ex. | Mixture Mole Ratios[a] $\frac{SiO_2}{Al_2O_3}$ | $\frac{OH^-}{SiO_2}$ | $\frac{M}{SiO_2}$ | Compound | Days | Product |
|---|---|---|---|---|---|---|
| 10 | 90 | 0.40 | 0.10 | ↓ | 2 | 25% ZSM-5 |
| 11 | 90 | 0.40 | 0.10 | $(C_8H_4N_2)_4Cu$ | 2 | 15% ZSM-5 |
| 12 | 180 | 0.30 | 0.20 | $(C_8H_4N_2)_4Li_2$ ↓ ↓ | 2 | 15% ZSM-5 + α-quartz + α cristobalite |
| 13 | 90 | 0.30 | 0.10 | ↓ ↓ | 3 | 30% ZSM-5 + α quartz + α-cristobalite |
| 14 | 180 | 0.40 | 0.10 | (o-phenan)$_3$RuCl$_2$ ↓ | 2 | 15% ZSM-5 + unident. component |
| 15 | 90 | 0.40 | 0.10 | ↓ | 2 | Amorphous |
| 16 | 60 | 0.40 | 0.10 | ↓ | 2 | Amorphous |
| 17 | 90 | 0.40 | 0.10 | (o-phenan)$_3$FeClO$_4$ | 2 | 10% mordenite |
| 18 | 90 | 0.40 | 0.10 | Ru(bipyr)$_3$Cl$_2$ ↓ | 3 | 40% mordenite + trace comp. |
| 19 | 90 | 0.40 | 0.10 | (bipyr)$_3$FeClO$_4$ | 2 | 10% ZSM-5 |
| 20 | 90 | 0.40 | 0.10 | Ni(bipyr)$_3$ClO$_4$ | 2 | 10% mordenite |
| 21 | 60 | 0.40 | 0.10 | ↓ | 3 | 15% mordenite |
| 22 | 90 | 0.40 | 0.10 | $[(C_5H_5)Fe(C_5H_4)N(CH_3)_3]I$ | 4 | 15% ZSM-5 |
| 23 | 90 | 0.40 | 0.10 | $[(C_5H_5)Fe(C_5H_4)N(CH_3)_3]Br$ | 2 | 25% ZSM-5 |

[a]$H_2O/SiO_2 = 40$: $Na^+/SiO_2 = 0.6$

As can be seen from the above table, the results obtained were indeed very interesting and completely unpredictable. Thus, in Examples 1–3, 5–7, 18, and 9–13 certain metal phthalocyanines were used and ZSM-5 was obtained. However, in Example 8 a nickel phthalocyanine was utilized, and no ZSM-5 was obtained. Attention is also invited to Example 4 utilizing cobalt phthalocyanine and, as can be seen, in this example no ZSM-5 was obtained when the $OH^-/SiO_2$ ratio was 0.6. In like manner, utilizing the complex of Example 14 resulted in ZSM-5 only in a high silica-to-alumina ratio and, indeed, when the silica-to-alumina ratio dropped from 180 to 90 and to 60 no ZSM-5 was obtained. Note that the nickel bipyridine complex of Example 20 did not produce any ZSM-5, whereas the iron bipyridine complex of Example 19 did.

EXAMPLES 24–25

The product of Example 10 and the product of Example 23 was subjected to various tests to determine if the metal was incorporated in the zeolite. The procedures employed and the results obtained are shown in the following table:

Source of Complexes Used

The complexes utilized in Examples 1–7 were purchased from Eastman Chemical Company. The complexes of Example 14 were purchased from the Strem Chemical Company. The complex of Example 22 was purchased from the Strem Chemical Company. The complex of Example 18 was prepared in accordance with the procedure described in the Journal of The Chemical Society, 1931, pp. 2213. The complex of Example 20 is available from G. T. Morgan & F. H. Burstall, J. Chem. Soc. 1931, 2213. The complex of Examples 20 and 21 can also be prepared in accordance with the Journal of The Chemical Society, 1931, pp. 2213. The complex of Examples 8, 9, 10 and 11 are available from the Eastman Chemical Company. The complex of Examples 12 and 13 is available from Eastman Kodak, and the complex of Example 1 is also available from Eastman Kodak.

What is claimed is:

1. In the process for the synthesis of ZSM-5 from a forming solution containing a mixture of alumina, silica, alkali metal oxide and water, the improvement which

TABLE III

Test to Determine if The Metal is Incorporated into The Zeolite

| Example | Template | Product | Treatment of Product | Analysis of Product After Treatment |
|---|---|---|---|---|
| 24 | $(C_8H_4N_2)_4VO$ | 25% ZSM-5 1.9% Na (Ex. 10) | (1) Soxhlet extracted 1 week with CHCl$_3$ to remove vanadium (2) Exchanged with NH$_4$NO$_3$[a] | 3.5% V 230 ppm Na |
| 25 | $[(Cp)Fe(CpCH_2N(CH_3)_3Br]^+$ | 25% ZSM-5 6.7% Fe +1.6% Na (Ex. 23) | (1) EDTA treated[b] (2) Exchanged with NH$_4$NO$_3$ | 6.7% Fe 0.09% Na |

[a]Exchange using 1M NH$_4$NO$_3$ solution: zeolite boiled in three successive fresh solutions for one hour in first two solutions and overnight in the third solution.

[b]EDTA Treatment: zeolite boiled in 0.25M EDTA (NH$_4$OH neutralized to pH = 7.0) for two days.

As can be seen from the above table, attempts to remove the metal from the structure were unsuccessful, thereby demonstrating that the novel process of this invention results in placing of a metal within the zeolite structure.

comprises adding a complex selected from the group consisting of metal or hydrogen phthalocyanines, iron cyclopentyldienyl complexes and metal complexes containing a —N—C—C—N— aromatic grouping to the reaction mixture and maintaining the same at a temperature of from about 100° F. to about 400° F. until crystals of ZSM-5 are formed.

2. The process of claim 1 wherein the phthalocyanine has the following structural formula:

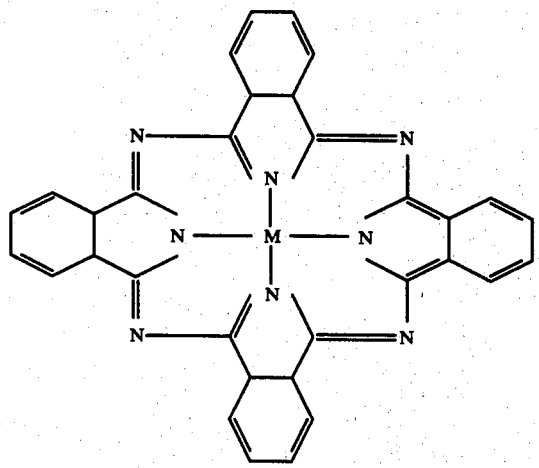

wherein M is copper, cobalt, lithium, vanadium oxide (VO) or hydrogen.

3. The process of claim 1 wherein the iron cyclopentyldienyl complexes have the following formula:

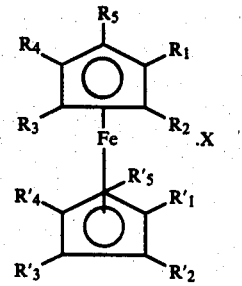

wherein R and R' are selected from the group consisting of hydrogen, a lower alkyl having 1-5 carbon atoms, and $(CH_2)_y N (CH_3)_3$ wherein Y is 0 or 1 and X is bromide, chloride or iodide with the proviso that only one R or R' can be said $(CH_2)_y N (CH_3)_3$.

4. The process of claim 1 wherein the complex containing a —N—C—C—N— aromatic grouping is either (a)

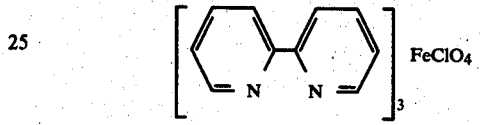

or (b)

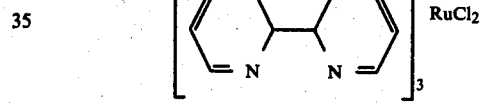

* * * * *